(12) United States Patent
Tuncay

(10) Patent No.: US 8,336,580 B2
(45) Date of Patent: Dec. 25, 2012

(54) CARTRIDGE

(75) Inventor: Hakan Cevat Tuncay, Manisa (TR)

(73) Assignee: Valfsel Armatur Sanayi Anonim Sirketi, Manisa (TR)

( * ) Notice: Subject to any disclaimer, the term of this patent is extended or adjusted under 35 U.S.C. 154(b) by 330 days.

(21) Appl. No.: 12/744,313

(22) PCT Filed: Jun. 2, 2008

(86) PCT No.: PCT/IB2008/052146
§ 371 (c)(1),
(2), (4) Date: Aug. 11, 2010

(87) PCT Pub. No.: WO2009/066190
PCT Pub. Date: May 28, 2009

(65) Prior Publication Data
US 2011/0036430 A1    Feb. 17, 2011

(30) Foreign Application Priority Data
Nov. 22, 2007 (TR) .................... 2007/08072

(51) Int. Cl.
*F16K 27/04* (2006.01)
*F16K 11/20* (2006.01)
(52) U.S. Cl. .............. 137/625.4; 137/454.2; 137/614
(58) Field of Classification Search ........ 137/599.08, 137/454.2, 454.6, 605, 614, 625.4, 625.41, 137/637.3
See application file for complete search history.

(56) References Cited

U.S. PATENT DOCUMENTS

| | | | | |
|---|---|---|---|---|
| 3,570,537 A * | 3/1971 | Kelly | ................ | 137/625.15 |
| 3,987,819 A * | 10/1976 | Scheuermann | ........... | 137/637.3 |
| 4,653,538 A * | 3/1987 | Tsutsui et al. | ........... | 137/625.46 |
| 4,674,678 A * | 6/1987 | Knebel et al. | ............ | 236/12.12 |
| 5,070,906 A * | 12/1991 | Orlandi | ................ | 137/606 |
| 5,127,438 A * | 7/1992 | Williams | .............. | 137/625.31 |
| 7,174,916 B2 * | 2/2007 | Chang | ................ | 137/637.3 |
| 7,841,362 B2 * | 11/2010 | Kim | ................ | 137/637 |
| 2005/0126643 A1 * | 6/2005 | Romero | ................ | 137/606 |
| 2006/0042705 A1 | 3/2006 | Chang | | |

FOREIGN PATENT DOCUMENTS

| | | |
|---|---|---|
| KR | 20050018770 A | 2/2005 |
| WO | WO02006031006 A | 3/2006 |

OTHER PUBLICATIONS

International Search Report, mailing date Nov. 5, 2008, for corresponding International Application No. PCT/IB2008/052146.

* cited by examiner

*Primary Examiner* — John Fox
(74) *Attorney, Agent, or Firm* — Intellectual Property Law Group LLP

(57) ABSTRACT

The present invention relates to a cartridge which comprises separate temperature and flow adjusting shafts whereby temperature and flow adjustments can be controlled separately from each other and where, if desired, the flow adjusting cartridge (3) and the temperature adjusting cartridge (4) can be separated from each other to be used in different mechanisms independent of each other.

1 Claim, 4 Drawing Sheets

CARTRIDGE

FIELD OF THE INVENTION

The present invention relates to a cartridge which comprises separate temperature and flow adjusting shafts whereby temperature and flow adjustments can be controlled independently from each other and where, if desired, flow and temperature cartridges can be used separately.

BACKGROUND OF THE INVENTION

Currently, there are various mechanisms which can perform temperature and flow control. Some of these mechanisms only control the temperature, some only control the flow and some others can control both temperature and flow.

In the Korean patent application No. KR20050018770, operating mechanism of the system is disclosed and it is stated that first of all hot and cold water are mixed and temperature adjusting is made, and then the flow adjusting is performed. These adjustments are performed by means of fixed and movable discs.

The U.S. Pat. No. 5,845,674 mentions about adjustability of temperature and flow independently from each other. The same application indicates both a flow control element and a temperature control element. The same application discloses a disk in the cartridge for adjusting the temperature.

The Turkish patent application No. TR200704329 discloses a cartridge wherein the temperature and the flow control shafts can be controlled separately.

Upon reviewing the above mentioned patent documents, it is seen that cartridges which can perform temperature and flow adjustment independently from or dependent on each other are present in the state of the art. However, the said cartridges have an integral nature and the cartridge which performs temperature adjustment or flow adjustment on demand can not be separated from the integral structure to be mounted to another mechanism.

SUMMARY OF THE INVENTION

The objective of the present invention is to ensure, during use of a faucet, that the temperature adjustment is performed once and subsequently the faucet is turned on/off only by flow control. By means of first performing temperature adjustment of the water in accordance with its direction of arrival and in the second stage carrying out flow control continuing in the flow direction of the water, temperature of the water is fixed and saving is obtained in energy, water and time together with ease in use.

Another objective of the invention is to realize a cartridge in which the temperature adjustment mechanism and the flow adjustment mechanism are formed by independent mechanisms that can be separated from each other.

DETAILED DESCRIPTION OF THE INVENTION

Figure 1:
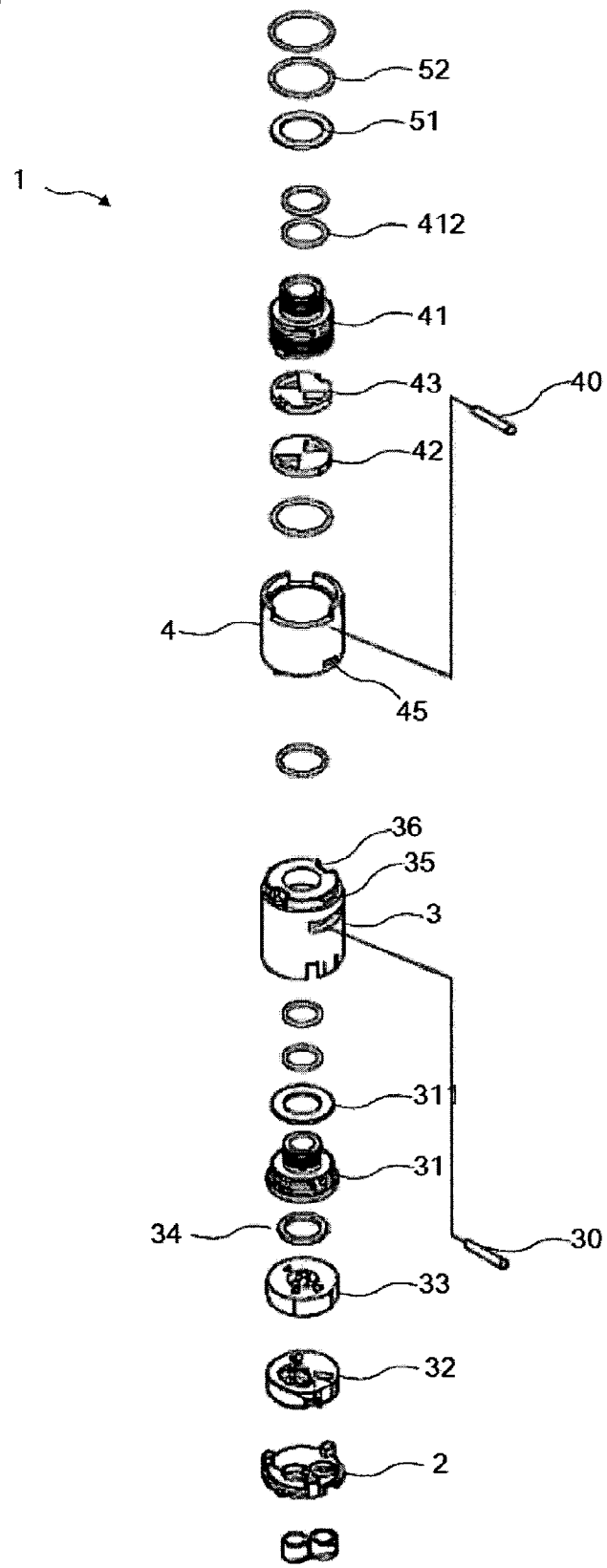
Figure 2:
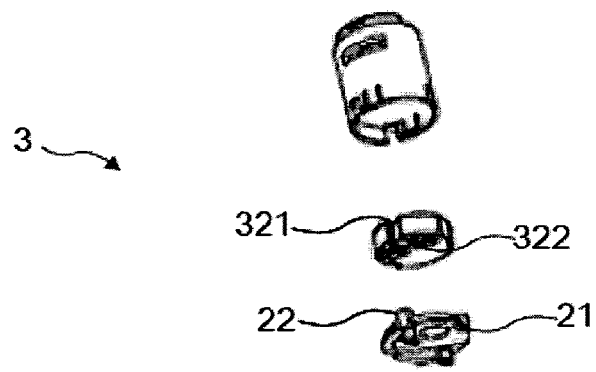
Figure 3:
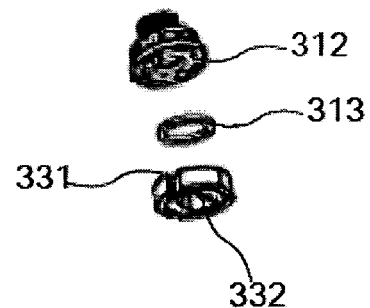
Figure 4:
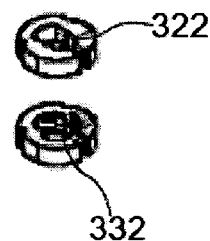
Figure 5:
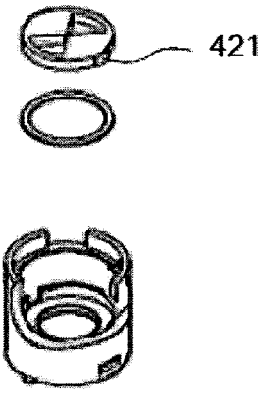
Figure 6:
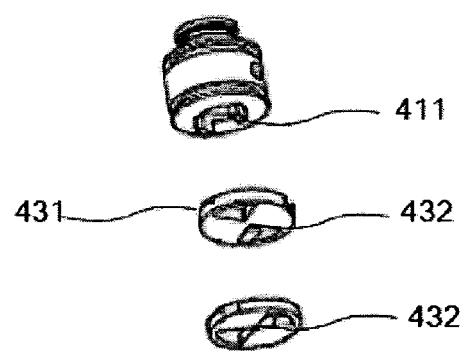
Figure 7:
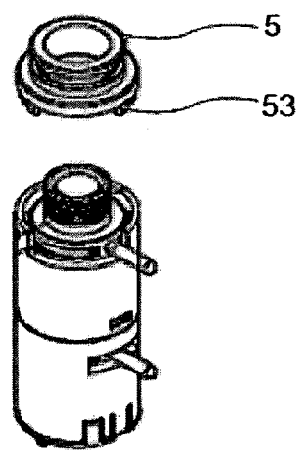
Figure 8:
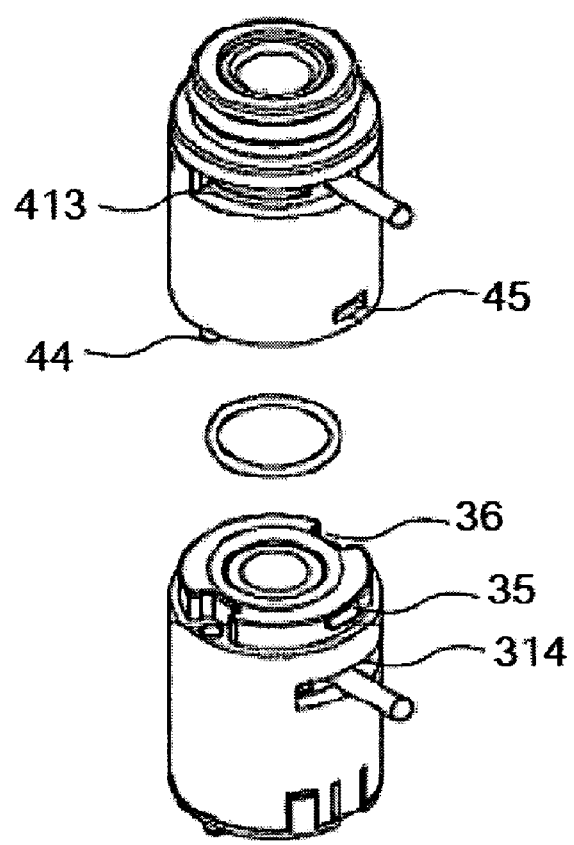

The cartridge realized to fulfill the objectives of the present invention is illustrated in the accompanying figures, in which;

FIG. 1 is the front view of the cartridge.
FIG. 2 is the view of the temperature adjusting element of the cartridge.
FIG. 3 is the view of the fixed ceramic disk of the cartridge.
FIG. 4 is the view of the form holes of the cartridge.
FIG. 5 is the view of the movement channels and tabs of the cartridge.
FIG. 6 is the view of the shafts and fastening holes of the cartridge.
FIG. 7 is the view of the tabs and tab channels of the cartridge.
FIG. 8 is the view showing the connection of the temperature adjusting cartridge and flow adjusting cartridge of the cartridge.

The components shown in the figures are numbered as follows:
1. Cartridge
2. Lower cap
21. Channels
22. Legs
3. Temperature adjusting cartridge
30. Temperature adjusting shaft
31. Temperature adjusting element
311. Teflon Seal
312. Leg
313. O-ring
314. Fastening Hole
32. Fixed ceramic disk
321. Channel
322. Form hole
33. Movable ceramic disk
331. Channel
332. Form hole
34. Gasket
35. Tab
36. Channel
4. Flow adjusting cartridge
40. Flow adjusting shaft
41. Flow adjusting element
411. Leg
412. O-ring
413. Fastening Hole
42. Fixed ceramic disk
421. Tab
422. Form hole
43. Movable ceramic disk
431. Channel
432. Form hole
44. Leg
45. Tab slot
5. Upper cap
51. Teflon seal
52. O-ring
53. Channels The cartridge (1) comprises a lower cap (2) which is provided at the bottom and enables hot and cold water to enter into the cartridge (1) together, at least one temperature adjusting cartridge (3) wherein temperature adjustment of the hot and cold mixed water entering into the cartridge (1) from the lower cap (2) is performed, at least one flow adjusting cartridge (4) wherein flow adjustment of the temperature adjusted mixed water is performed, at least one upper cap (5) through which the temperature and flow adjusted water exits from the cartridge.

In the inventive cartridge (1), the lower cap (2), through which the water enters and on which there are arranged the temperature and flow adjusting elements, comprises channels (21) and legs (22) to facilitate mounting of the said elements.

In the inventive cartridge (1), the temperature adjusting cartridge (3) comprises a temperature adjusting shaft (30) which performs temperature adjustment with its right/left movement, a temperature adjusting element (31) by which precise temperature adjustment is performed, a fixed ceramic disk (32) which is the first location that the water entering from the lower cap (2) arrives, a movable ceramic disk (33) where the incoming hot and cold water mix, at least one gasket (34) located in between the fixed ceramic disk (32) and the movable ceramic disk (33) providing sealing.

In the inventive cartridge (1), the flow adjusting cartridge (4) comprises a flow adjusting shaft (40) which performs flow adjustment with its right/left movement, a flow adjusting element (41) by which precise flow adjustment is performed, a fixed ceramic disk (42) which is the first location that the temperature adjusted water coming from the temperature adjusting cartridge (3) arrives, a movable ceramic disk (43) which adjusts by its rotational movement how much water should exit from the cartridge (1).

In the inventive cartridge (1), the upper cap (5), through which the temperature and flow adjusted water exits the cartridge (1), comprises at least one Teflon seal (51) which serves as a bearing for the flow adjusting element (41), minimizes friction and conveys the pressing force coming from the press nut to the sealing members whereby produces the force that will provide sealing at the said elements; at least one o-ring (52) which provides sealing during use of the cartridge; and channels (53) which enable connection to the other elements located in the cartridge.

In the inventive cartridge (1), the temperature adjusting element (31) comprises at least one Teflon seal (311) thereon which in addition to serving as a bearing for the rotation movement of the temperature adjusting shaft (30) it also reduces friction, legs (312) which enable connection of the said temperature adjusting element (31) to the other elements, at least one o-ring (313) which provides sealing within the temperature adjusting element (31), and at least one fastening hole (314) into which the temperature adjusting shaft (30) is arranged.

In the inventive cartridge (1), the fixed ceramic disk (32) responsible for temperature adjustment comprises at least one channel (321) which enables connection thereof to the other elements and at least one form hole (322) which is required during the process of temperature adjustment. The movable ceramic disk (33) comprises at least one channel (331) which enables connection thereof to the other elements and a form hole (332) thereon for performing temperature adjustment. By fastening of the legs (312) provided on the temperature adjusting element (31), to the channels (321) on the movable ceramic disc (33) in an axial direction, the rotation force coming from the temperature adjusting shaft (30) is conveyed to the movable ceramic disc (33). The fixed ceramic disk (32) is secured by engagement of the legs (22) on the lower cap (2) to the channels (321) provided on the disk. Upon positioning of the form hole (332) on the movable ceramic disc (33) and the form hole (332) on the fixed ceramic disc (32) with the right/left rotation movement of the movable ceramic disc (12), the mixture with the desired temperature is obtained.

In the inventive cartridge (1), there are provided legs (411) on the flow adjusting element (41) connecting the said element to the other members, at least one o-ring (412) providing sealing, and at least one fastening hole (413) into which the flow adjusting shaft (40) is arranged.

In the inventive cartridge (1), the fixed ceramic disk (32) is fixed to the body by engagement of the legs (22) on the lower cap (2) to the channels (321) on the fixed ceramic disk (32) in an axial direction and by engagement of the tabs (35) on the body to the channels (21) on the lower cap (2). The legs (411) located on the flow adjusting element (41) are fastened to the channels (431) provided on the movable ceramic disk (43). This way, the flow adjusting shaft (40) and the movable ceramic disk (43), and the flow adjusting element (41) are rotated together. By aligning the form hole (432) on the flow movable ceramic disc (43) with the form hole (422) on the fixed ceramic disc (42) by means of the rotation movement, flow adjustment and opening and closing control are provided.

In the inventive cartridge (1), the temperature adjusting cartridge (3) and the flow adjusting cartridge (4) are mounted to each other by means of the tabs (35) which are located on the temperature adjusting cartridge (3) and fit into the slots (45) provided on the flow adjusting cartridge (4), and by legs (44) which are located on the flow adjusting cartridge (4) and fit into the channels (36) provided on the temperature adjusting cartridge (3). Thus, the temperature adjusting cartridge (3) and the flow adjusting cartridge (4) can be separated on demand, and can function in independent mechanisms.

It is possible to develop various embodiments of the inventive cartridge (1) within the scope of this fundamental concept. The invention can not be limited to the examples described herein; it is essentially according to the claims.

The invention claimed is:

1. A cartridge (1) comprising a lower cap (2) which is provided at the bottom, enables hot and cold water to enter into the cartridge (1) together and includes thereon channels (21) and legs (22), a temperature adjusting cartridge (3) in which temperature adjustment of the hot and cold mixed water entering into the cartridge (1) from the lower cap (2) is performed; and which contains a temperature adjusting shaft (30) thereon, at least one temperature adjusting element (31) consisting of a Teflon seal (311), leg (312), o-ring (313) and fastening hole (314); at least one fixed ceramic disk (32) consisting of channels (321) and a form hole (322); at least one movable ceramic disk (33) consisting of channels (331) and a form hole (332); at least one sealing gasket between the fixed ceramic disk (32) and the movable ceramic disk (33).

a flow adjusting cartridge (4), in which flow adjustment of the temperature adjusted mixed water is performed; and which contains a flow adjusting shaft (40) thereon, at least one flow adjusting element (41) consisting of a leg (411), o-ring (412) and fastening hole (413); at least one fixed ceramic disk (42) consisting of tabs (421) and a form hole (422); at least one movable ceramic disk (43) consisting of channels (431) and a form hole (432);

at least one upper cap (5), through which the temperature and flow adjusted water exits from the cartridge, and which contains thereon a Teflon seal (51), o-ring (52) and channels (53), and characterized by tabs (35) which are located on the temperature adjusting cartridge (3) and fit into the slots (45) provided on the flow adjusting cartridge (4), and by legs (44) which are located on the flow adjusting cartridge (4) and fit into the channels (36) provided on the temperature adjusting cartridge (3).

* * * * *